Nov. 12, 1929.  E. F. WALSH ET AL  1,735,065
AUTOMATIC DUMPING BODY FOR MOTOR VEHICLES
Filed March 17, 1924   2 Sheets-Sheet 1
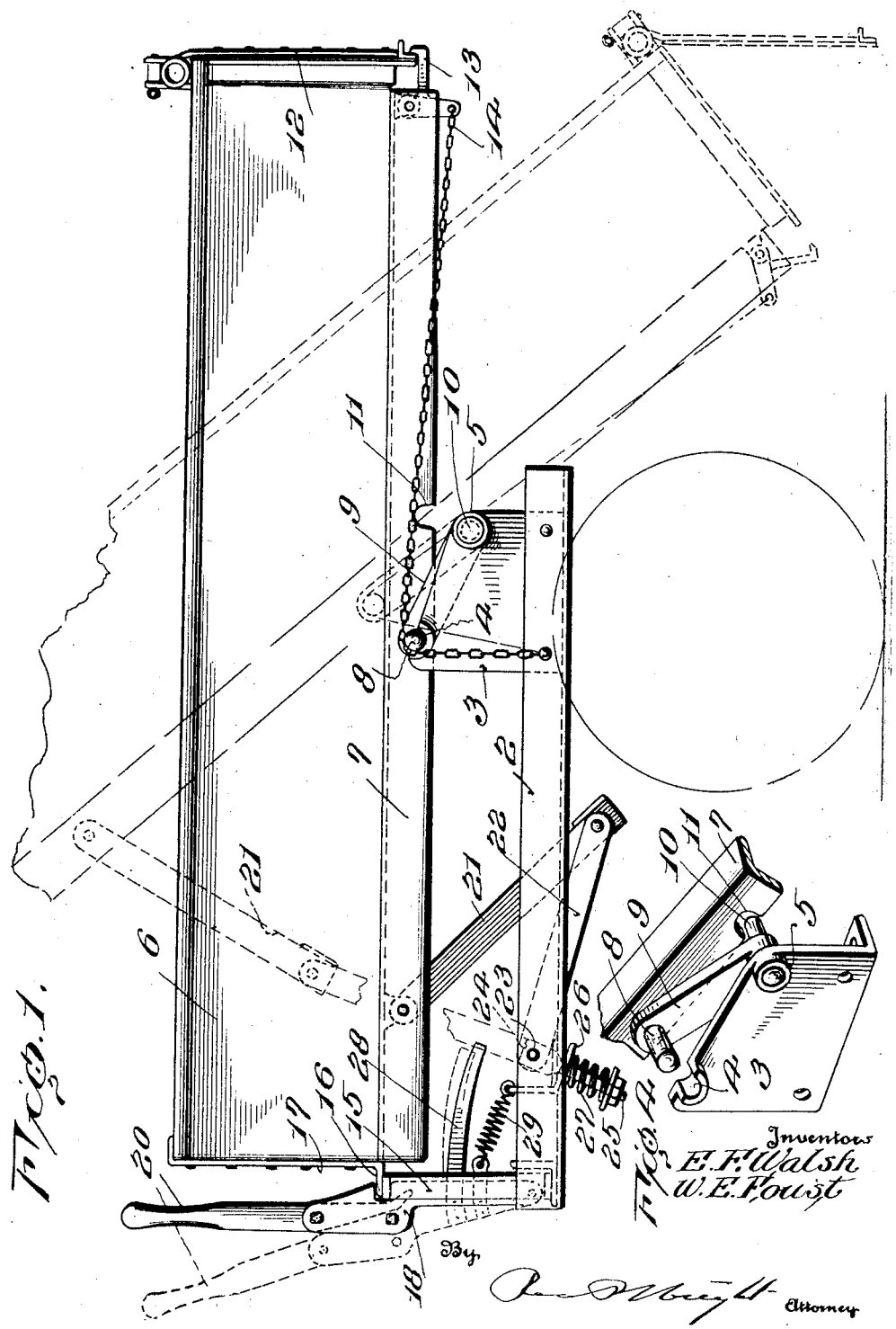

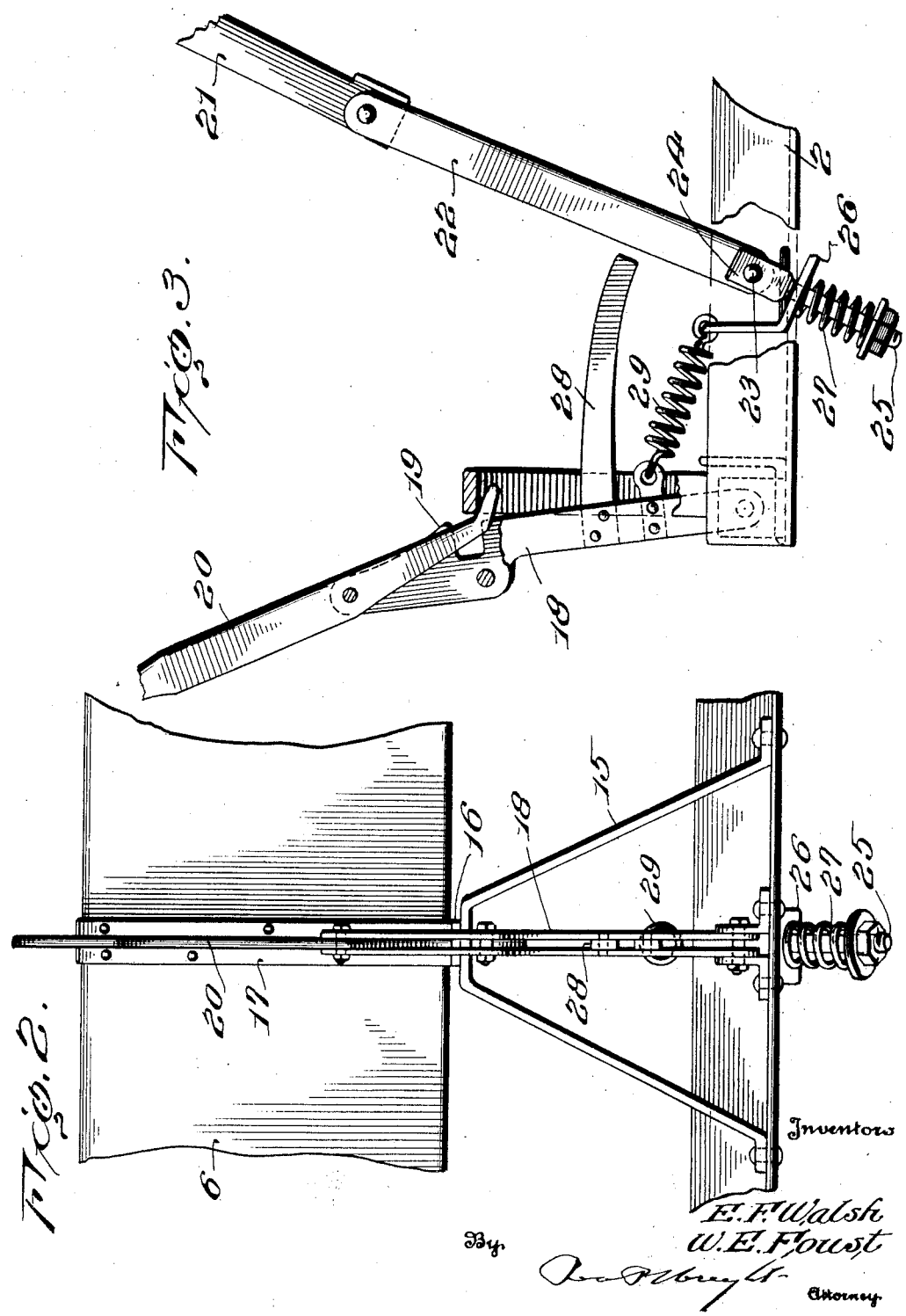

Patented Nov. 12, 1929

1,735,065

UNITED STATES PATENT OFFICE

EDWARD F. WALSH AND WILLIAM E. FOUST, OF MARION, INDIANA

AUTOMATIC DUMPING BODY FOR MOTOR VEHICLES

Application filed March 17, 1924. Serial No. 699,749.

This invention relates to an automatic dumping body for motor vehicles, such as motor trucks and the like, the object being to provide a motor vehicle with a dumping body which will act automatically when the body is released, the body being so mounted that it tilts by gravity when loaded and returns to its normal position when unloaded.

Another and further object of the invention is to provide a tilting body of a motor vehicle in which the body is provided with two fulcrums, the body moving on one fulcrum when loaded and swinging on the other fulcrum when unloaded so that when the body is released when loaded, it will be moved into a tilted position to discharge its load and when unloaded, it will move back into its normal position by gravity.

A further object of the invention is to provide novel means for releasing the tail gate when the body is moved into tilted position.

Another and further object of the invention is to provide novel means for holding the body in tilted position after it has moved by gravity into such position.

Another and further object of the invention is to provide novel means for locking the body when loaded in position on the motor truck in such a manner that all danger of its automatically tilting is prevented.

Other and further objects and advantages of the invention will be hereinafter set forth and the novel features thereof defined by the appended claims.

In the drawings,

Figure 1 is a side elevation of a portion of a motor truck constructed in accordance with our invention showing the body in tilted position;

Figure 2 is a detail front elevation showing the locking and releasing means;

Figure 3 is a side elevation of the same, partly in section; and

Figure 4 is a detail perspective view of the means for pivotally mounting the body so that it will swing on different fulcrums.

In the drawings 2 indicates the chassis of a motor truck to the side bars of which adjacent the rear end are secured supports 3 provided with semi-circular bearings 4 at their forward ends and tubular bearings 5 at the rear ends.

Arranged above the chassis is a body 6 which is provided with side bars 7 from which extend trunnions 8 adapted to rest in the bearings 4, said trunnions carrying links 9 provided with stud shafts 10 which are mounted in the bearings 5 and are adapted to be engaged by the notched portions 11 of the angle irons 7 of the body as clearly shown in Figures 1 and 4. While we have only shown one of the supports and manner of mounting the same, it is, of course, understood that one of these supports and mountings are arranged to each side of the body and as they are formed exactly alike, the description of one is sufficient for both.

The trunnion 8 upon which the body swings on its initial movement to tilting position is arranged just in front of the center line of the body so that when the body is loaded, the rear end of the body is heavier than the forward end of the body so that it tilts automaticaly into position as shown in dotted lines and as it tilts, its fulcrum is changed from the trunnion 8 to the shaft 10 so that when the load has been discharged, the forward end of the body becomes the heavier which allows the body to return to its normal position by gravity as will be hereinafter fully described.

The body is provided with a pivoted tail gate 12 locked by a pivoted latch 13 to which is connected a chain 14 which passes over the trunnion 8 and is secured to the chassis 2 so that when the body is moved into tilting position, the latch is automatically released so as to release the tail gate and to allow the body to discharge its load.

Secured to the front cross bar of the chassis 2 is a bracket 15 forming a support for the upwardly extending portion 16 of a bar 17 secured to the front end of the body. Pivotally mounted on the cross bar of the chassis 2 under the bracket 15 is a locking lever 18 provided with a hook portion 19 adapted to extend over the upwardly extending portion 16 of the bar 17 in order to lock the dumping body so as to prevent it from tilting.

This lever 18 is provided with a pivoted hand lever 20 which is provided with an angled end extending under the bracket as shown in Figure 3. When the lever is moved into forward position as shown in Figure 3, the hook 19 is moved out from over the extension 16 and the body is allowed to tilt by gravity. When the body returns, it strikes the beveled portion of the hook and rides under the hook portion so as to lock it in its normal position.

In order to provide means for holding the body in tilted position, we secure to the under side of the body a link 21 to which is pivotally connected a link 22, the end of which is pivotally connected at 23 to the head 24 of a bolt 25 which is slidably mounted in an aperture of a bracket 26 carried by the chassis of the motor vehicle, said bolt carrying a nut and washer and surrounded by a spring 27 as clearly shown in order to allow the pivoted links 21 and 22 to straighten out before collapsing as shown in full or dotted lines in Figure 1. When the body is thrown into tilted position, the links straighten out so as to hold the body in that position and when it is desired to allow the body to return to its normal position, the lever 20 is grasped by the operator and pulled towards the body which forces the arm 28 carried by the lever 18 into engagement with the link 22 in order to allow the links to collapse, which releases the body and the body swings on its rear fulcrum which is to the rear of the center of the body back into its normal position.

The lever 18 is connected to the bracket 26 by a coil spring 29 which has a tendency to hold the hook over the extension 16 of the bar 17 at all times in order to prevent the body from being released when loaded and when the lever 20 carried thereby is forced forward, the hooked end of the lever is brought into engagement with the bracket 15 so as to hold the lever 18 in its forward position which prevents the arm 28 from being forced into engagement with the link 22.

In the operation of the dumping body as herein shown when the body is loaded and it is desired to dump the load, the operator of the vehicle pushes forward on the lever 20 which forces the lever 18 forward and throws the hook 19 from over the forwardly extending portion 16 of the bar 17 and as the rear end of the body is heavier, the body pivots on the trunnions 8 as the fulcrum.

As the body moves upwardly into tilting position, the links 21 and 22 straighten out and hold the body in this position. At the forward tilting movement of the body, the body changes its fulcrum from the trunnion 8 to the shaft 10 which makes the forward end of the body the heavier. As the body is moved into tilted position, the chain is drawn taut which releases the latch in order to allow the tail gate to swing open and dump its load. After the load has been dumped, the operator pulls the lever 20 backwardly which throws the arm 28 into engagement with the link 22 so as to collapse the links 21 and 22 and the body by gravity returns to its normal position.

From the foregoing description it will be seen that we have provided an automatic dumping body for trucks and the like in which the body is mounted on changing fulcrums so that it dumps by gravity and returns to its normal position by gravity.

What we claim is:—

1. A motor truck comprising a chassis, a body mounted on said chassis and adapted to tilt automatically into an inclined position when loaded and return to horizontal position when unloaded, said body having a projection, means for holding said body in tilted position, a sectional lever engaging said projection for locking said body in horizontal position and a projection carried by one of the sections of said lever adapted to engage and release said holding means for allowing said body to return to horizontal position.

2. A motor truck having a chassis, a tilting body mounted on said chassis, a bracket for supporting the forward end of said body, a pair of pivotally connected links connecting said body to said chassis, a sectional lever for locking said body in horizontal position on said bracket, one of the sections of said lever having an extension adapted to engage one of said links for breaking the joint thereof to allow said body to return to horizontal position.

3. A motor truck having a chassis, a body mounted on said chassis adapted to tilt automatically into an inclined position when loaded and to return to horizontal position when unloaded, a bracket for supporting the forward end of said body, said body having a projection above said bracket, means for holding said body in tilted position, a sectional lever mounted on said chassis formed of an upper and a lower section pivotally connected together, the lower section of said lever being provided with a hook adapted to engage the projection of said body for locking said body in horizontal position, the lower end of said upper section being adapted to engage said bracket for moving said hook portion from over the projection of said body.

4. A motor vehicle having a body mounted to automatically move into an inclined position when loaded and back into horizontal position when unloaded, a lever for locking said body in horizontal position, a link pivotally connected to said body, a link yieldably connected to the frame of said vehicle having a pivoted connection to the first mentioned link, and an extension carried by said locking lever adapted to engage one of said links for breaking the joint of said links to release said body and allow it to return to horizontal position.

In testimony whereof we hereunto affix our signatures.

EDWARD F. WALSH.
WILLIAM E. FOUST.